(12) United States Patent
Sohn et al.

(10) Patent No.: US 7,605,989 B1
(45) Date of Patent: Oct. 20, 2009

(54) COMPACT AUTO-FOCUS IMAGE TAKING LENS SYSTEM WITH A MICROMIRROR ARRAY LENS AND A LENS-SURFACED PRISM

(75) Inventors: Jin Young Sohn, Fullterton, CA (US); Gyoung II Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 0 days.

(21) Appl. No.: 12/177,876

(22) Filed: Jul. 22, 2008

(51) Int. Cl.
*G02B 17/00* (2006.01)
(52) U.S. Cl. .................... 359/726; 359/737
(58) Field of Classification Search .......... 359/678, 359/726, 733–737; 396/72, 77, 79, 85; 348/337, 348/338

See application file for complete search history.

(56) References Cited

U.S. PATENT DOCUMENTS

| 7,006,132 | B2 * | 2/2006 | Pereira et al. ............ 348/218.1 |
| 2006/0092524 | A1 * | 5/2006 | Konno ........................ 359/678 |
| 2008/0291543 | A1 * | 11/2008 | Nomura et al. ............. 359/676 |

* cited by examiner

*Primary Examiner*—Darryl J Collins (57) ABSTRACT

A compact auto-focus image taking lens system with a Micromirror Array Lens and a lens-surfaced prism of the present invention comprises a lens-surfaced prism, an aperture stop, a first lens element, a second lens element, a Micromirror Array Lens, and an image surface, optionally an infrared cut-off filter. By introducing a Micromirror Array Lens and a lens-surfaced prism, the compact auto-focus image taking lens system with a Micromirror Array Lens and a lens-surfaced prism of the present invention has many advantages over the prior arts in the field of invention, such as compactness in thickness, small number of optical elements, high performance of optical quality, fast focusing speed, low power consumption, enough space for optional elements such as an infrared cut-off filter and diversity in optical geometries.

25 Claims, 8 Drawing Sheets

COMPACT AUTO-FOCUS IMAGE TAKING LENS SYSTEM WITH A MICROMIRROR ARRAY LENS AND A LENS-SURFACED PRISM

FIELD OF INVENTION

The present invention relates to a compact lens for a small sized imaging taking device in general and more specifically to a compact lens system and auto-focus system with a small number of lens elements and a Micromirror Array Lens.

BACKGROUND OF THE INVENTION

As the image sensor and optical technology progresses, hand-held devices and small sized optical applications become popular. Further, with the development of higher performance cellular phones and portable cameras, small sized image modules and lens systems with high optical quality, fast focusing speed, and low power consumption are currently under development. Especially, the advances of image sensors in the field of miniaturization and highly dense pixels increase the need of optical module or lens system with high resolution performance and more compactness. Due to the optical configuration and constraints, the size of handheld devices has limitation to become smaller.

In response to such needs, a small number lens construction may be used in order to satisfy the requirements of compactness and low cost. Because of the constraint of small number of optical lenses, aspheric surface design becomes popularly spread in order to achieve higher performance.

Conventional automatic focusing systems perform their automatic focusing by moving one or more lenses using an electro-magnetically driven motor and/or piezo-electrically actuated apparatus. Since the lens or lenses in those systems have a considerable inertia and need to have macroscopic mechanical motions, the automatic focusing systems require a macroscopic actuator generating large actuating force. The macroscopic actuator can cause many problems including increase in size, large power consumption, slow focusing time, and eventually decrease in the probability of the imaging system. The automatic focusing can be performed by moving a sensor, as well. But, it also requires a macroscopic actuator with additional complexity necessary to satisfy electrical connection. Alternatively, a movable mirror can be used for simpler automatic focusing. The movable mirror can provide a simple and reliable automatic focusing, but it still requires a macroscopic actuator.

The compact auto-focus image taking lens system with a Micromirror Array Lens and a lens-surfaced prism of the present invention has many advantages over the prior arts in the field of invention, such as compactness in thickness, small number of optical elements, higher performance of optical quality, fast focusing speed, low power consumption, enough space for optional elements such as infrared cut-off filter and diversity in optical geometry.

SUMMARY OF THE INVENTION

The main purpose of the present invention is to provide highly compact and fast focusing optical lens system to be applied to the hand-held devices and small optical applications. The compact auto-focus image taking lens system with a Micromirror Array Lens and a lens-surfaced prism of the present invention has many advantages and can be applied to various designs of the optical applications; especially thickness of the optical system, focusing time, and power consumption can considerably be reduced.

A compact auto-focus image taking lens system with a Micromirror Array Lens and a lens-surfaced prism of the present invention comprises a lens-surfaced prism, an aperture stop, a first lens, a second lens element, a Micromirror Array Lens, and an image sensor, optionally an infrared cut-off filter. In a preferable configuration and embodiment, each component of the compact auto-focus image taking lens system with a Micromirror Array Lens and a lens-surfaced prism of the present invention has the following property and geometry.

While the auto-focusing is performed, the Micromirror Array Lens is controlled to satisfy the convergence condition and the phase matching condition. The general principle and methods for making the Micromirror Array Lens are disclosed in U.S. Pat. No. 6,934,072 issued Aug. 23, 2005 to Kim, U.S. Pat. No. 6,934,073 issued Aug. 23, 2005 to Kim, U.S. Pat. No. 6,970,284 issued Nov. 29, 2005 to Kim, U.S. Pat. No. 6,999,226 issued Feb. 14, 2006 to Kim, U.S. Pat. No. 7,031,046 issued Apr. 18, 2006 to Kim, U.S. Pat. No. 7,095,548 issued Aug. 22, 2006 to Cho, U.S. Pat. No. 7,161,729 issued Jan. 9, 2007 to Kim, U.S. Pat. No. 7,239,438 issued Jul. 3, 2007 to Cho, U.S. Pat. No. 7,267,447 issued Sep. 11, 2007 to Kim, U.S. Pat. No. 7,274,517 issued Sep. 25, 2007 to Cho, U.S. patent application Ser. No. 11/426,565 filed Jun. 26, 2006, U.S. patent application Ser. No. 11/743,664 filed May 2, 2007, and U.S. patent application Ser. No. 11/933,105 filed Oct. 31, 2007, all of which are incorporated herein by references. And the detail of the general properties of the Micromirror Array Lens are disclosed in U.S. Pat. No. 7,173,653 issued Feb. 6, 2007 to Gim, U.S. Pat. No. 7,215,882 issued May 8, 2007 to Cho, U.S. Pat. No. 7,236,289 issued Jun. 26, 2007 to Baek, U.S. Pat. No. 7,354,167 issued Apr. 8, 2008 to Cho, U.S. patent application Ser. No. 11/218,814 filed Sep. 2, 2005, and U.S. patent application Ser. No. 11/382,273 filed May 9, 2006, all of which are incorporated herein by references.

The lens-surfaced prism of the present invention has a concave surface on the object side, an internal reflective surface, and a surface on the image side. The lens-surfaced prism has an internal reflection surface between the surfaces of the object side and the image side. The internal reflective surface of the prism preferably makes total internal reflection, wherein the optical index of the prism is larger than 1.5. Or the internal reflective surface of the prism is a reflective surface made of internal reflective coating. This internal reflective coating of the lens-surfaced prism is made of metal or dielectric materials.

The compact auto-focus image taking lens system with a Micromirror Array Lens and a lens-surfaced prism of the present invention comprises an aperture stop between the lens-surfaced prism and the first lens element to increase the optical performance of the system.

The first lens element of the present invention has a negative optical refractive power. The first lens element is preferably made of plastic with Abbe number less than 35.0. The first lens element can have at least one aspheric surface on the object side and on the image side. The first lens element has a meniscus shape with a convex surface on the object side. Also, the first lens element can have both side aspheric surfaces on the object side and on the image side.

The second lens element of the present invention has a positive optical refractive power. The second lens element has at least one aspheric surface on the object side and on the image side. Also the second lens element has a meniscus shape with a convex surface on the object side. The second lens element has both side aspheric surfaces on the object side and on the image side. The second lens element is made of plastic. Preferably the second lens element is made of plastic with Abbe number larger than 45.0 or made of glass with Abbe number larger than 45.0.

The compact auto-focus image taking lens system with a Micromirror Array Lens and a lens-surfaced prism of the present invention can further comprise a Micromirror Array Lens between the second lens element and the image surface to reflect incident light to the image surface of the image sensor. The Micromirror Array Lens comprises a plurality of micromirrors having reflective surfaces. The Micromirror Array Lens is configured to change focus of the image by controlling the motions of the micromirrors while reducing the thickness of the lens system. The Micromirror Array Lens changes optical power to change focus of the image. The Micromirror Array Lens has zero optical power when an object lies at a reference object distance of the lens system. The Micromirror Array Lens has negative optical power when an object lies at a distance farther than the reference object distance of the lens system. The Micromirror Array Lens has positive optical power when an object lies at a distance nearer than the reference object distance of the lens system.

The compact auto-focus image taking lens system with a Micromirror Array Lens and a lens-surfaced prism of the present invention can further comprise of an infrared cut-off filter between the second lens element and the image surface to enhance the image quality.

In another possible embodiment, the compact auto-focus image taking lens system with a Micromirror Array Lens and a lens-surfaced prism of the present invention comprises a lens-surfaced prism having a concave surface on the object side, an internal reflective surface, and a surface on the image side, wherein both sides of the object side and the image sides are aspheric, an aperture stop, a first lens element being a negative optical refractive power meniscus shape lens with a convex on the object side, wherein the first lens element is made of plastic with at least one aspheric surface on the object side surface and the image side surface, a second lens element having a positive optical refractive power, a Micromirror Array Lens comprising a plurality of micromirrors having reflective surfaces, and an image surface, wherein the image taking lens system makes an image on the image surface. All the above elements are arranged in order from an object side to an image side.

The Micromirror Array Lens is configured to change focus of the image by controlling the motions of the micromirrors while reducing the thickness of the lens system. The Micromirror Array Lens changes optical power to change focus of the image. The Micromirror Array Lens has zero optical power when an object lies at a reference object distance of the lens system. The Micromirror Array Lens has negative optical power when an object lies at a distance farther than a reference object distance of the lens system. The Micromirror Array Lens has positive optical power when an object lies at a distance nearer than a reference object distance of the lens system.

The first lens element of the present invention has both side aspheric surfaces on the object side surface and on the image side surface. The second lens element of the present invention has at least one aspheric surface on the object side and on the image side surface with a convex on the object side surface. Alternatively, the second lens element has a meniscus shape with a convex on the object side.

Also the compact auto-focus image taking lens system with a Micromirror Array Lens and a lens-surfaced prism of the present invention can further comprise of an infrared cut-off filter between the second lens element and the image surface.

In a last example of embodiment, the compact auto-focus image taking lens system with a Micromirror Array Lens and a lens-surfaced prism of the present invention comprises a lens-surfaced prism having a concave surface on the object side, an internal reflective surface, and a concave surface on the image side, an aperture stop, a first lens element being a negative optical refractive power meniscus shape lens with a convex on the object side, wherein the first lens element is made of plastic with at least one aspheric surface on the object side surface and the image side surface, a second lens element having a positive optical refractive power with a convex on the object side, wherein the second lens element is made of plastic with Abbe number larger than 45.0, a Micromirror Array Lens comprising a plurality of micromirrors having reflective surfaces, and an image surface, wherein the image taking lens system makes an image on the image surface. All the above elements are arranged in order from an object side to an image side.

The Micromirror Array Lens is configured to change focus of the image by controlling the motions of the micromirrors while reducing the thickness of the lens system. The Micromirror Array Lens changes optical power to change focus of the image. The Micromirror Array Lens has zero optical power when an object lies at a reference object distance of the lens system. The Micromirror Array Lens has negative optical power when an object lies at a distance farther than a reference object distance of the lens system. The Micromirror Array Lens has positive optical power when an object lies at a distance nearer than a reference object distance of the lens system.

The second lens element has at least one aspheric surface on the object side and on the image side surface with a convex on the object side surface. The second lens element can have a meniscus shape with a convex on the object side.

DESCRIPTION OF FIGURES AND TABLES

The present invention will become more fully understood from the detailed description given below and the accompanying drawings and tables, which are given by way of illustration only and thus are not limitative of the present invention, wherein.

TABLE 1 shows detailed surface properties of compact auto-focus image taking lens system with a Micromirror Array Lens and a lens-surfaced prism of the present invention according to the embodiment 1 in order from the object side.

TABLE 2 shows aspheric surface coefficients of compact auto-focus image taking lens system with a Micromirror Array Lens and a lens-surfaced prism of the present invention according to the embodiment 1.

TABLE 3 shows detailed surface properties with conic coefficients of compact auto-focus image taking lens system with a Micromirror Array Lens and a lens-surfaced prism of the present invention according to the embodiment 3 in order from the object side.

TABLE 4 shows detailed surface properties of compact auto-focus image taking lens system with a Micromirror Array Lens and a lens-surfaced prism of the present invention according to the embodiment 4 in order from the object side; and TABLE 5 shows aspheric surface coefficients of compact auto-focus image taking lens system with a Micromirror Array Lens and a lens-surfaced prism of the present invention according to the embodiment 4.

DETAILED DESCRIPTION OF THE INVENTION

Figure 1:
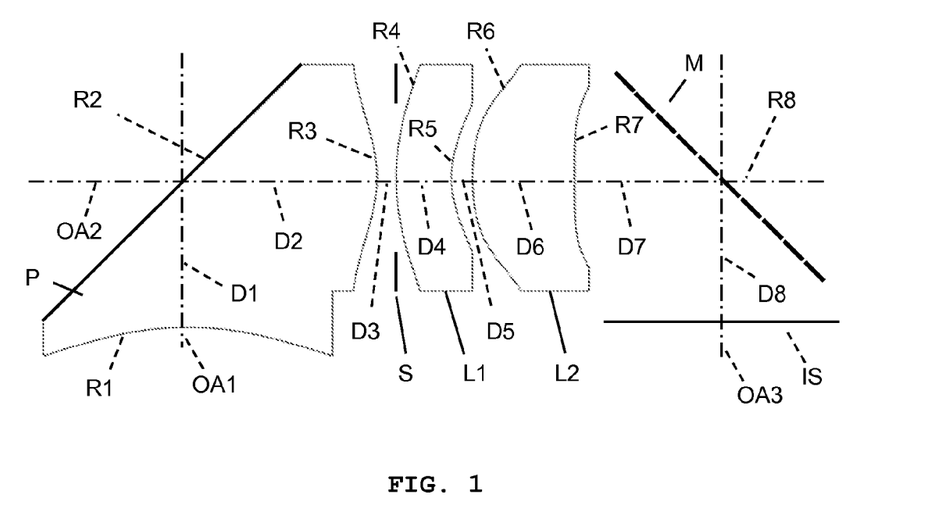
FIG. 1 shows a cross-sectional view of the compact auto-focus image taking lens system with a Micromirror Array Lens and a lens-surfaced prism of the present invention according to the embodiment 1.

FIG. 1 shows a cross-sectional view of the compact auto-focus image taking lens system with a Micromirror Array Lens and a lens-surfaced prism of the present invention according to the embodiment 1. Surfaces of the compact auto-focus image taking lens system are numbered from the object side to the image side. The incident light comes from the object side (left bottom side) and passes along the optical axes OA1, OA2, and OA3 with reflection by the surfaces R2 and R8. The light from the object finally makes an image on the image surface IS.

Surfaces R1 and R3 are lens-surfaces of the lens-surfaced prism P. Surface R2 is the reflective surface of the lens-surfaced prism P. The surface R2 makes an internal reflection with change of optical axis from OA1 to OA2. The aperture stop S is located in between the lens-surfaced prism P and the first lens element L1. The first lens element L1 having surfaces R4, R5 has a meniscus shape with a convex on the object side. Focusing by the second lens element L2 having surfaces R6, R7 and the reflection by the surface R8 of the Micromirror Array Lens M makes an image on the image surface IS. Distances D1-D8 represent on-axis surface spacing.

In the embodiment 1, the lens-surfaced prism P has aspheric surfaces R1, R3 on both sides of the lens-surfaced prism P to the object side and the image side. The reflective surface R2 in the lens-surfaced prism P makes an internal reflection from the bottom side of the system along the optical axis OA1, to the right side of the system along the optical axis OA2. Preferably, the surface R2 makes total internal reflection with all fields of the ray through the lens system. Additional reflective coating can be applied to the reflecting surface R2 to enhance the reflection performance. The reflective coating can be made of metal coating or dielectric materials.

In TABLE 1, the surface properties are listed in the order of the surface number from the object side to the image side. Inside the parentheses beside the surface number #, (A) means the aspheric surface profile and (R) means the reflective surface. The surface number # with surface property, the radius of curvature R (in mm) of each surface, on-axis surface spacing D (in mm), as well as the refractive index $N_d$ and the Abbe number $v_d$ are given in TABLE 1. The whole lens system is normalized by the effective focal length of the lens system. Refractive index of the material is measured at the d-line of 587.6 nm and the Abbe number $v_d$ is measured by:

$$v_d = \frac{N_d - 1}{N_F - N_C} \qquad \text{equation (A)}$$

where $N_d$, $N_F$, $N_C$ are the refractive index at the d-line of 587.6 nm, F-line of 586.1 nm, and C-line of 656.3 nm, respectively.

In TABLE 2, the surface coefficients of the aspheric surfaces are listed. Each aspheric surface is described by:

$$Z = \frac{CY^2}{1 + \sqrt{1-(1+K)C^2Y^2}} + A_4 Y^4 + A_6 Y^6 + A_8 Y^8 + A_{10} Y^{10} \qquad \text{equation (B)}$$

where

Z is the length (in mm) of a line draw from a point on the aspheric surface at a distance Y from the optical axis to the tangential plane of the aspheric surface vertex, C is the curvature (inverse of the radius of the curvature, R) of the aspheric lens surface, Y is the distance (in mm) from the optical axis, K is the conic coefficient of the surface, and $A_4$, $A_6$, $A_8$, and $A_{10}$ are the fourth, sixth, eighth, and tenth aspheric coefficients, respectively.

The aspheric coefficients which are not listed in the TABLE 2 are zero. An "E" in the data indicates that the number following the "E" is the exponent to the base 10. For example, "5.426E+01" represents the number $5.426 \times 10^2$.

Thanks to the configuration of the lens-surfaced prism and the Micromirror Array Lens, the whole lens system can have small thickness (the thickness appears as height in FIG. 1). The compact auto-focus image taking lens system with a Micromirror Array Lens and a lens-surfaced prism of the present invention has many advantages to make thinner and compact auto-focusing lens module thanks to the combined properties of the reflective geometry of the lens system, the lens-surfaced prism, and the Micromirror Array Lens. The lens-surfaced prism itself performs its function as a prism and a lens at the same time and the Micromirror Array Lens performs auto-focusing by changing its optical power. Changing optical power of the Micromirror Array Lens is obtained by controlling the micromirrors in the Micromirror Array Lens.

Figure 2:
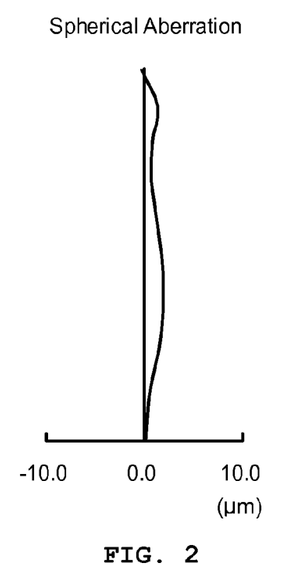
FIG. 2 shows aberration of the compact auto-focus image taking lens system with a Micromirror Array Lens and a lens-surfaced prism of the present invention according to the embodiment 1.

FIG. 2 shows aberration of the compact auto-focus image taking lens system with a Micromirror Array Lens and a lens-surfaced prism of the present invention according to the embodiment 1. Even though the lens system is not rotationally symmetric, the aberration is calculated from the height from the optical axis. The aberration is calculated at the E-line of 546.07 nm. The aberration is shown for an f-number of 2.8481

Figure 3:
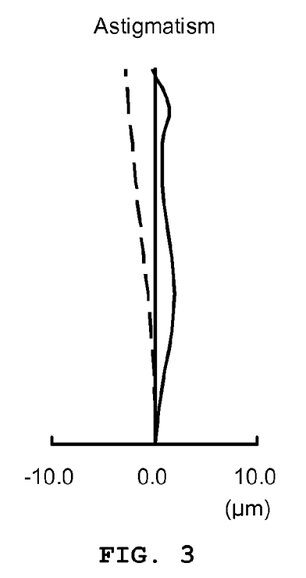
FIG. 3 shows astigmatism of the compact auto-focus image taking lens system with a Micromirror Array Lens and a lens-surfaced prism of the present invention according to the embodiment 1.

FIG. 3 shows astigmatism of the compact auto-focus image taking lens system with a Micromirror Array Lens and a lens-surfaced prism of the present invention according to the embodiment 1. The astigmatism for the compact auto-focus image taking lens system with a Micromirror Array Lens and a lens-surfaced prism of the present invention is shown at the E-line of 546.07 nm for the sagital image surface S (in solid line) and the tangential image surface T (in dashed line).

Figure 4:
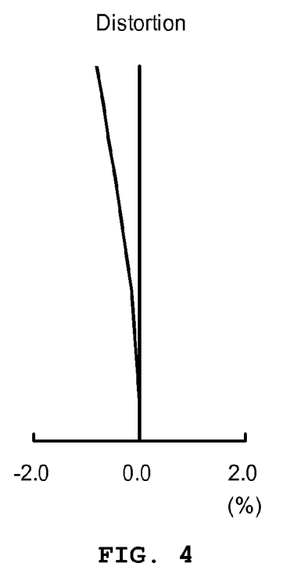
FIG. 4 shows distortion of compact auto-focus image taking lens system with a Micromirror Array Lens and a lens-surfaced prism of the present invention according to the embodiment 1.

FIG. 4 shows distortion of the compact auto-focus image taking lens system with a Micromirror Array Lens and a lens-surfaced prism of the present invention according to the embodiment 1. The distortion for the compact image taking lens system with a lens-surfaced prism of the present invention is shown at the E-line of 546.07 nm. The half-field angle ω for FIG. 3 and FIG. 4 is 26.55°.

Figure 5:
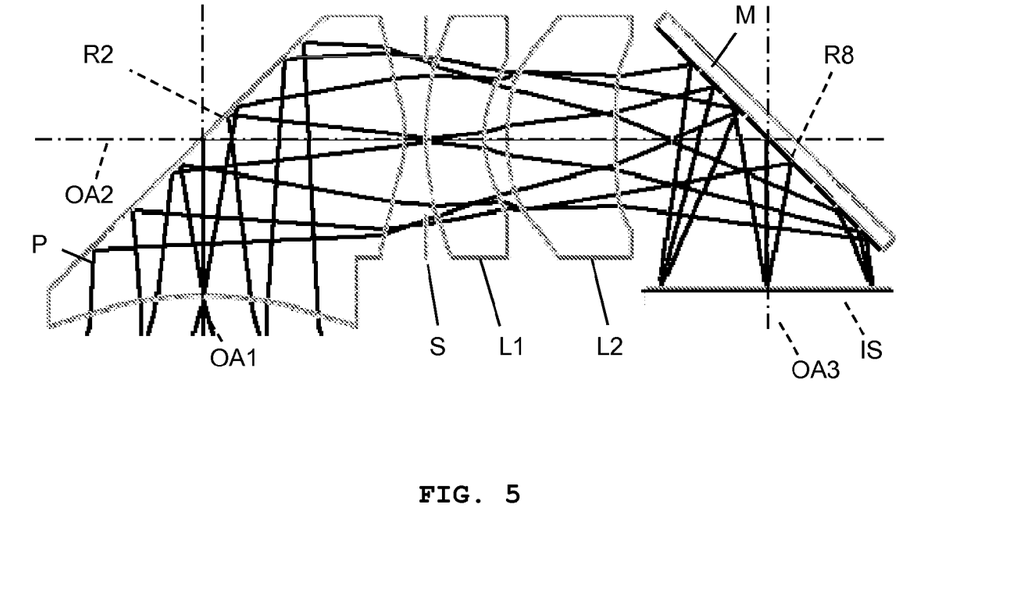
FIG. 5 shows a cross-sectional view of the compact auto-focus image taking lens system with a Micromirror Array Lens and a lens-surfaced prism of the present invention with optical ray profile at reference object distance.

FIG. 5 shows a cross-sectional view of the compact autofocus image taking lens system with a Micromirror Array Lens and a lens-surfaced prism of the present invention with optical ray profile at reference object distance. When the Micromirror Array Lens M remains flat, the focus of the lens system is designed for focusing the optical ray on the image surface IS. With the optical power of the lens-surfaced prism P, the first lens element L1, and the second lens element L2, the optical lens system makes its focus on the image surface IS. From this base point, the Micromirror Array Lens M changes its optical power to perform its auto-focusing property while satisfying the convergence condition and the phase matching condition. When the object distance changes, the Micromirror Array Lens M changes it optical power according to the object distance change while maintaining the image distance. In FIGS. 6-9, the detail process of the auto-focusing is illustrated and described.

Figure 6:
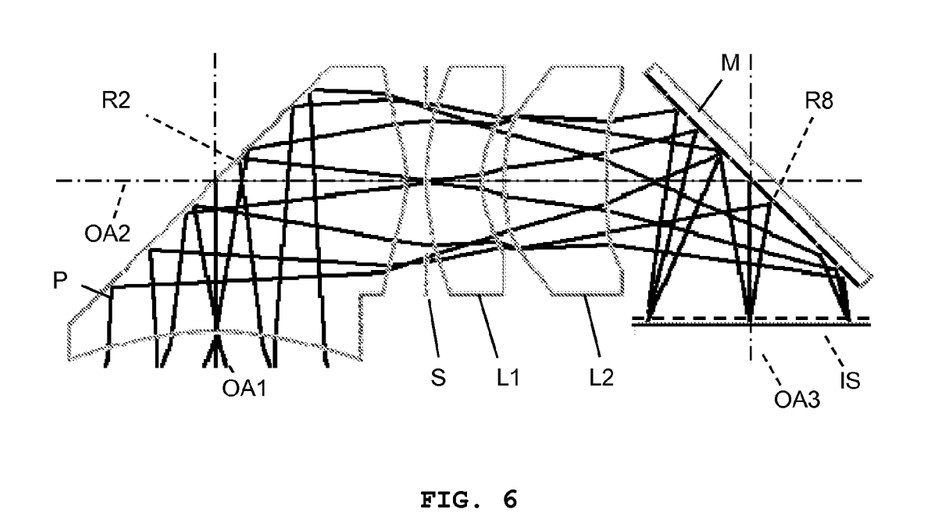
FIG. 6 shows a cross-sectional view of the compact auto-focus image taking lens system with a Micromirror Array Lens and a lens-surfaced prism of the present invention with optical ray profile at a distance father than reference object distance while the Micromirror Array Lens remains zero optical power.

FIG. 6 shows a cross-sectional view of the compact autofocus image taking lens system with a Micromirror Array Lens and a lens-surfaced prism of the present invention with optical ray profile at a distance father than reference object distance while the Micromirror Array Lens remains zero optical power. As easily can be seen in FIG. 6, the lens system makes its focus with shorter image distance when the object is located at a distance nearer than the reference object distance. The FIG. 6 shows the ray propagation of the lens system. The clear difference of the focus change is illustrated. With the focus change, the image of the object is blurred and out-of-focus. The function of the Micromirror Array Lens M is to correct the focus of the lens system to make the focus on the image surface IS.

Figure 7:
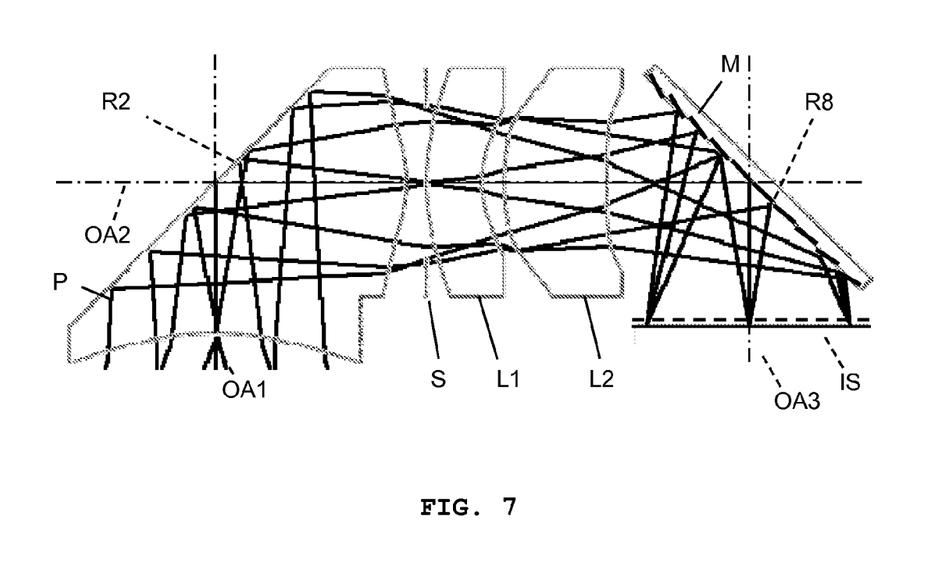
FIG. 7 shows a cross-sectional view of the compact auto-focus image taking lens system with a Micromirror Array Lens and a lens-surfaced prism of the present invention with optical ray profile at a distance father than reference object distance while the Micromirror Array Lens remains has negative optical power to make focus on image surface.

FIG. 7 shows a cross-sectional view of the compact autofocus image taking lens system with a Micromirror Array Lens and a lens-surfaced prism of the present invention with optical ray profile at a distance father than reference object distance while the Micromirror Array Lens has negative optical power to make focus on image surface. Since the image of the object is focused with shorter image distance, the Micromirror Array Lens M changes its optical power to negative to make the image distance longer. Also the Micromirror Array Lens M satisfies the convergence and phase matching conditions to make a good quality of the image. The focusing of the whole lens system with Micromirror Array Lens M now makes its focus on the image surface IS again to make a good quality of the image. To make the image distance longer, the Micromirror Array Lens M has convex-like optical profiles with respect to the object distances. Convex-like optical profile is obtained by controlling each micromirror in the Micromirror Array Lens with proper rotational and translational motions.

The general principle, structure and methods for making the discrete motion control of MEMS device are disclosed in U.S. Pat. No. 7,330,297 issued Feb. 12, 2008 to Noh, U.S. Pat. No. 7,365,899 issued Apr. 29, 2008 to Gim, U.S. Pat. No. 7,382,516 issued Jun. 3, 2008 to Seo, U.S. Pat. No. 7,400,437 issued Jul. 15, 2008 to Cho, U.S. patent application Ser. No. 11/347,590 filed Feb. 4, 2006, U.S. patent application Ser. No. 11/369,797 filed Mar. 6, 2006, U.S. patent application Ser. No. 11/426,565 filed Jun. 26, 2006, U.S. patent application Ser. No. 11/534,613 filed Sep. 22, 2006, U.S. patent application Ser. No. 11/534,620 filed Sep. 22, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007, U.S. patent application Ser. No. 11/742,510 filed Apr. 30, 2007, and U.S. patent application Ser. No. 11/762,683 filed Jun. 13, 2007, all of which are incorporated herein by references.

Figure 8:
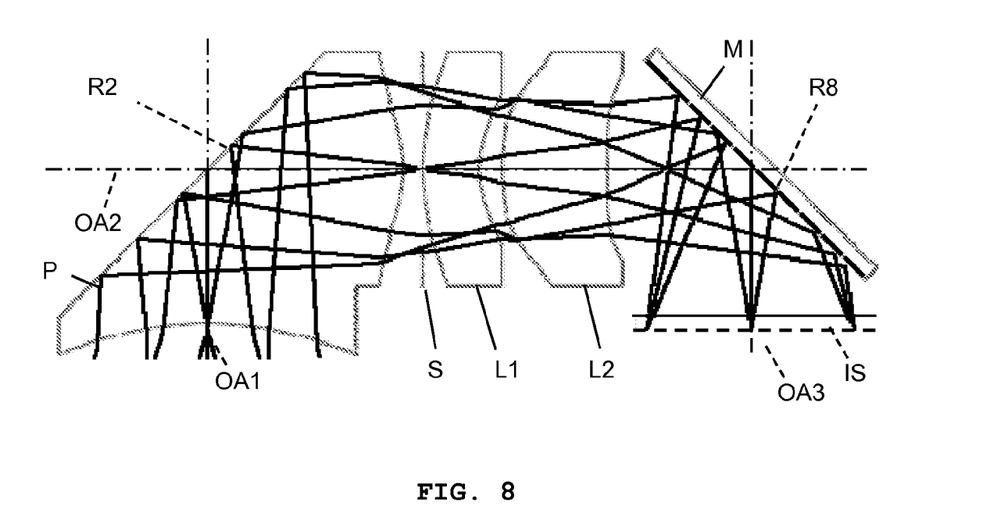
FIG. 8 shows a cross-sectional view of the compact auto-focus image taking lens system with a Micromirror Array Lens and a lens-surfaced prism of the present invention with optical ray profile at a distance nearer than reference object distance while the Micromirror Array Lens remains zero optical power.

FIG. 8 shows a cross-sectional view of the compact auto-focus image taking lens system with a Micromirror Array Lens and a lens-surfaced prism of the present invention with optical ray profile at a distance nearer than reference object distance while the Micromirror Array Lens remains zero optical power. As easily can be seen in FIG. 8, the lens system makes its focus with longer image distance when the object is located at a distance nearer than the reference object distance. The FIG. 8 shows the ray propagation of the lens system with object distance nearer than the reference object distance. The clear difference of the focus change is illustrated. With the focus change, the image of the object is blurred and out-of-focus. The function of the Micromirror Array Lens M is to correct the focus of the lens system to make the focus on the image surface IS.

Figure 9:
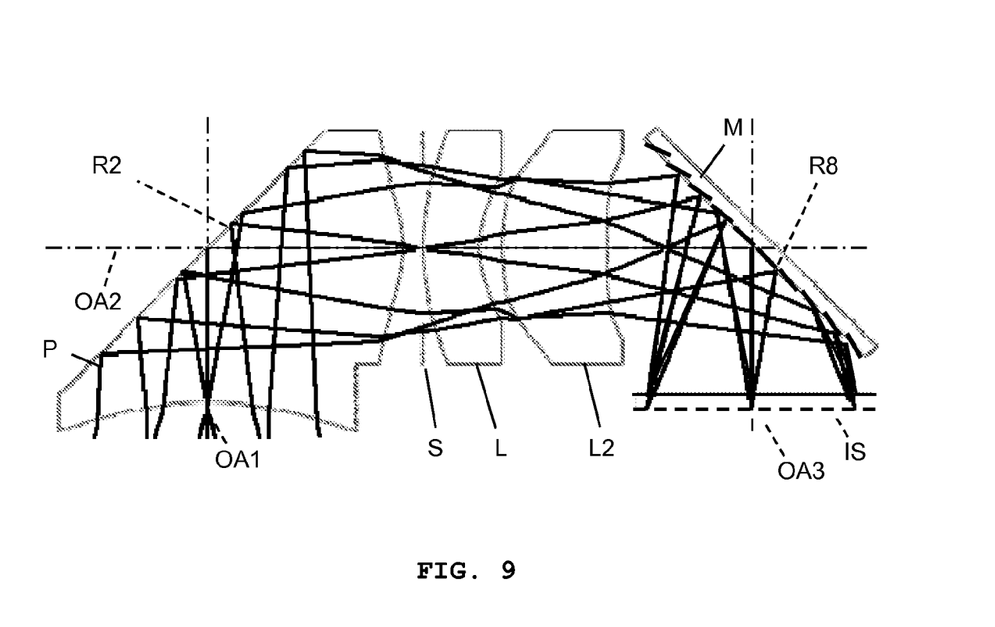
FIG. 9 shows a cross-sectional view of the compact auto-focus image taking lens system with a Micromirror Array Lens and a lens-surfaced prism of the present invention with optical ray profile at a distance nearer than reference object distance while the Micromirror Array Lens remains has positive optical power to make focus on image surface.

FIG. 9 shows a cross-sectional view of the compact auto-focus image taking lens system with a Micromirror Array Lens and a lens-surfaced prism of the present invention with optical ray profile at a distance nearer than reference object distance while the Micromirror Array Lens has positive optical power to make focus on image surface. Since the image of the object is focused with longer image distance, the Micromirror Array Lens M changes its optical power to positive to make the image distance shorter. Also the Micromirror Array Lens M satisfies the convergence and phase matching conditions to make a good quality of the image. The focusing of the whole lens system with Micromirror Array Lens M now makes its focus on the image surface again. To make the image distance shorter, the Micromirror Array Lens M has concave-like optical profiles with respect to the object distances. Concave-like optical profile is obtained by controlling each micromirror in the Micromirror Array Lens M with proper rotational and translational motions.

Figure 10:
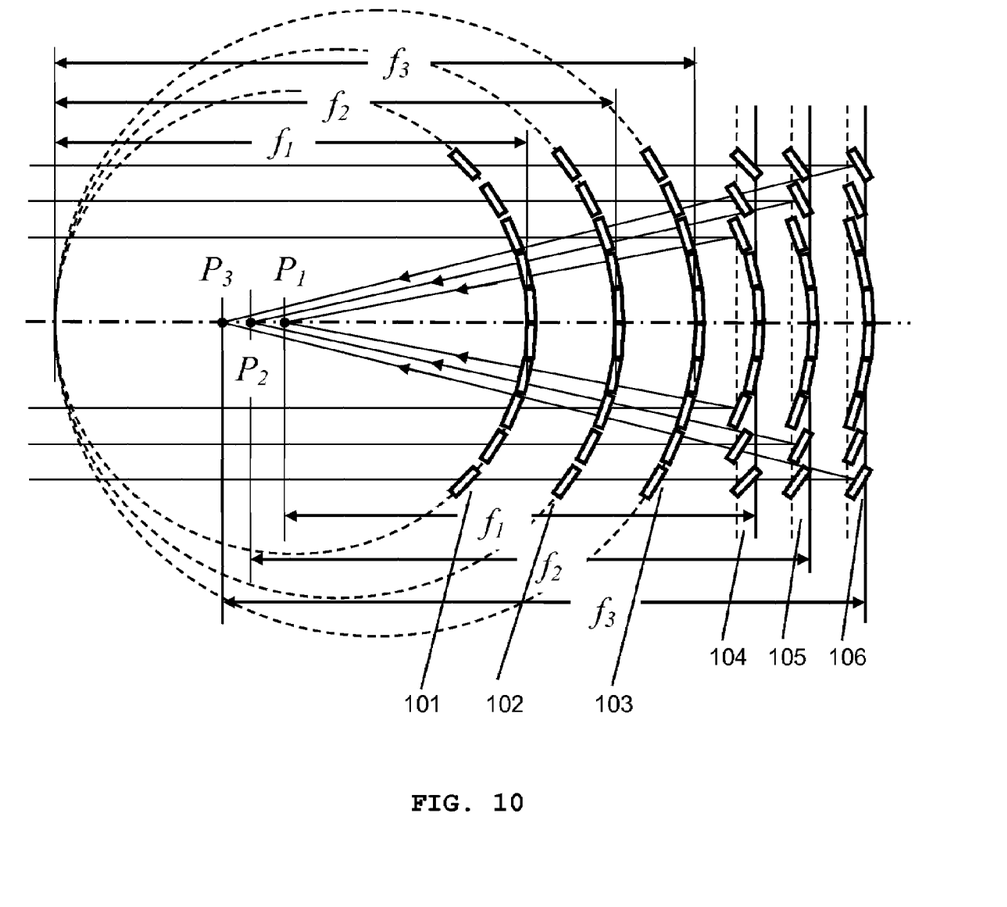
FIG. 10 shows principle of the focusing of the Micromirror Array Lens while changing focal length of the Micromirror Array Lens.

FIG. 10 shows principle of the focusing of the Micromirror Array Lens while changing focal length of the Micromirror Array Lens. For the purpose of the simple illustration, the figure shows the cases of spherical lens system. There are illustrated three spheres with different focal lengths $f_1$, $f_2$, $f_3$, which make three concave mirror surfaces 101, 102, 103. These concave shaped mirrors can be fabricated on a plane with satisfying the convergence condition and phase matching condition. The plane surfaced mirrors 104, 105, 106 have focal lengths of $f_1$, $f_2$, $f_3$ respectively. Each of the plane surfaced mirrors forms one optical surface profile of the Micromirror Array Lens. The three optical profiles of the Micromirror Array Lens make the focus at distances $P_1$, $P_2$, $P_3$, respectively. Actually the three optical profiles make their focus at the same point. Due to the illustration purpose, plane surfaced mirrors are drawn at different positions, but the three optical surfaces are located at the same position and the focus of the Micromirror Array Lens is the same point ($P_1$, $P_2$, $P_3$ are actually the same point. Only due to the illustration, the points are located at different positions).

Figure 11:
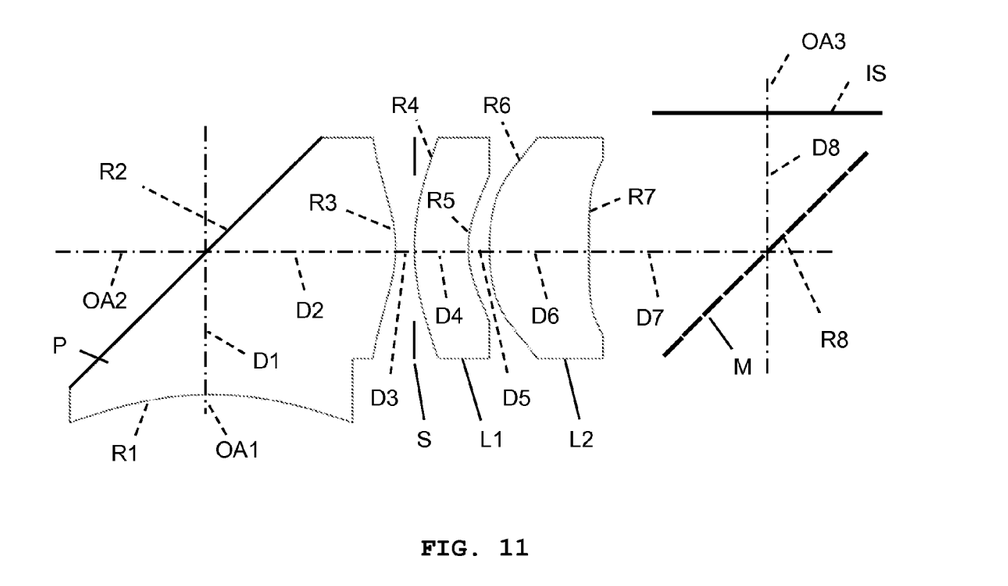
FIG. 11 shows a cross-sectional view of the compact auto-focus image taking lens system with a Micromirror Array Lens and a lens-surfaced prism of the present invention according to the embodiment 2.

FIG. 11 shows a cross-sectional view of the compact auto-focus image taking lens system with a Micromirror Array Lens and a lens-surfaced prism of the present invention according to the embodiment 2. The lens configuration is the same as FIG. 1 except reflecting direction of the Micromirror Array Lens. In the embodiment 2, the direction of the reflecting ray is now upward, thus the incident direction is from downward and the focusing direction is upward. This configuration has the configuration advantage against the embodiment 1. Surfaces of the compact auto-focus image taking lens system are numbered from the object side to the image side. The incident light comes from the object side (left bottom side) and passes through the optical axes OA1, and OA2 with reflection by the surface R2. The light from the object finally makes an image on the image surface IS. In this configuration, the reflecting surface R8 is now upward reflecting direction. And the image surface IS is placed upward at the focus of the lens system. All the other variables and configurations are the same as the case of the embodiment 1.

With the optical power of the lens-surfaced prism P, the first lens element L1 having surfaces R4, R5, and the second lens element L2 having surfaces R6, R7, the optical lens system makes its focus on the image surface IS. From this base point, the Micromirror Array Lens M changes its optical power to perform its auto-focusing property while satisfying the convergence condition and the phase matching condition. When the object distance changes, the Micromirror Array Lens M changes it optical power according to the object distance change while maintaining the image distance. Distances D1-D8 represent on-axis surface spacing.

In this embodiment, the thickness is the width (from entrance of the prism to the image surface in FIG. 11). The thickness of the system is now a little thicker than that of the embodiment 1 due to the layout of the image sensor. As mentioned in FIG. 1, the thickness can be smaller with introducing the proper reflecting surface to the system. Proper geometry and configuration can be selected with respect to the whole application geometry.

Surface R1 and R3 are lens-surfaces of the lens-surfaced prism P. Surface R2 is the reflective surface of the lens-surfaced prism P. The surface R2 makes an internal reflection with change of optical axis from OA1 to OA2. The aperture stop S is located in between the lens-surfaced prism P and the first lens element L1. The first lens element L1 has a meniscus shape with a convex on the object side. Focusing by the second lens element L2 and the reflection by the surface R8 of the Micromirror Array Lens M makes an image on the image surface IS.

In the embodiment 2, the lens-surfaced prism P has aspheric surfaces R1, R3 on both sides to the object side and the image side as the case of FIG. 1. The reflective surface R2 in the lens-surfaced prism P makes an internal reflection from the bottom side of the system along the optical axis OA1, to the right side of the system along the optical axis OA2. Preferably, the surface R2 makes total internal reflection with all fields of the ray through the lens system. Additional reflective coating can be applied to the reflecting surface R2 to enhance the reflection performance. The reflective coating can be made of metal coating or dielectric materials.

Figure 12:
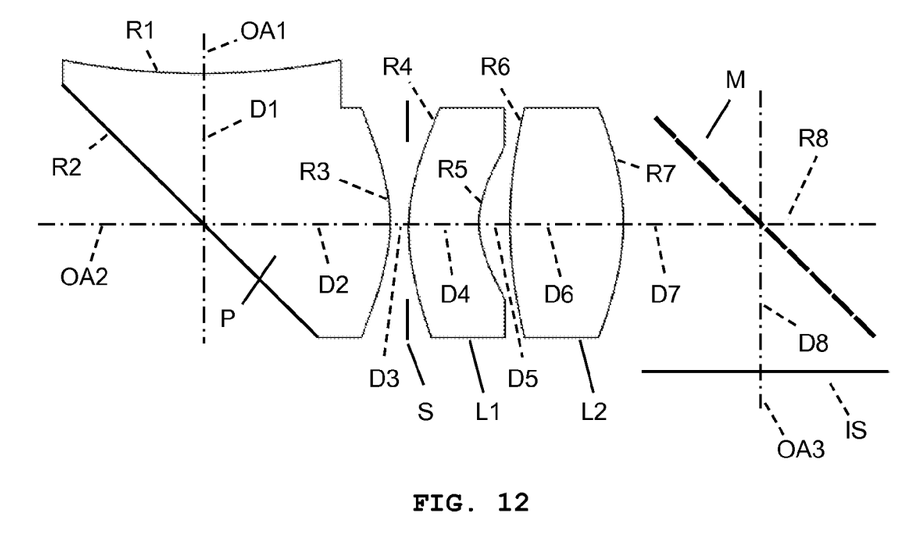
FIG. 12 shows a cross-sectional view of the compact auto-focus image taking lens system with a Micromirror Array Lens and a lens-surfaced prism of the present invention according to the embodiment 3.

FIG. 12 shows a cross-sectional view of the compact auto-focus image taking lens system with a Micromirror Array Lens and a lens-surfaced prism of the present invention according to the embodiment 3. Surfaces of the compact auto-focus image taking lens system are numbered from the object side to the image side. The incident light comes from the object side (left top side) and passes along the optical axes OA1, OA2, and OA3 with reflection by the surface R2 and R8 (the Micromirror Array Lens). The light from the object finally makes an image on the image surface IS. With the optical power of the lens-surfaced prism P, the first lens element L1, and the second lens element L2, the optical lens system makes its focus on the image surface IS. From this base point, the Micromirror Array Lens M changes its optical power to perform its auto-focusing property while satisfying the convergence condition and the phase matching condition.

When the object distance changes, the Micromirror Array Lens M changes its optical power according to the object distance change while maintaining the image distance.

Surfaces R1 and R3 are lens-surfaces of the lens-surfaced prism P. Surface R2 is the reflective surface of the lens-surfaced prism P. The surface R2 makes an internal reflection with change of optical axis from OA1 to OA2. The aperture stop S is located in between the lens-surfaced prism P and the first lens element L1. The first lens element L1 having surfaces R4, R5 has a meniscus shape with a convex on the object side. Focusing by the second lens element L2 having surfaces R6, R7 and the reflection by the surface R8 of the Micromirror Array Lens M makes an image on the image surface IS. Distances D1-D8 represent on-axis surface spacing.

In the embodiment 3, the lens-surfaced prism P has conic surfaces R1, R3 on both sides of the lens-surfaced prism P to the object side and the image side. The reflective surface R2 in the lens-surfaced prism P makes an internal reflection from the bottom side of the system along the optical axis OA1, to the right side of the system along the optical axis OA2. Preferably, the surface R2 makes total internal reflection with all fields of the ray through the lens system. Additional reflective coating can be applied to the reflecting surface R2 to enhance the reflection performance. The reflective coating can be made of metal coating or dielectric materials.

In TABLE 3, the surface properties are listed in the order of the surface number from the object side to the image side. Inside the parentheses beside the surface number #, (C) means the conic surface profile and (R) means the reflective surface. The surface number # with surface property, the radius of curvature R (in mm) of each surface, conic constants, on-axis surface spacing D (in mm), as well as the refractive index $N_d$ and the Abbe number $v_d$ are given in TABLE 3. The whole lens system is normalized by the effective focal length of the lens system. All the surfaces are designed as conic surfaces with only radius of the curvature and the conic constant. Refractive index of the material is measured at the d-line of 587.6 nm and the Abbe number $v_d$ is measured as equation (A).

In TABLE 3, the surface coefficient of the surface is listed. The aspheric conic surface is described by:

$$Z = \frac{CY^2}{1+\sqrt{1-(1+K)C^2Y^2}} \qquad \text{equation (C)}$$

where

Z is the length (in mm) of a line draw from a point on the aspheric surface at a distance Y from the optical axis to the tangential plane of the aspheric surface vertex, C is the curvature (inverse of the radius of curvature, R) of the aspheric lens surface, Y is the distance (in mm) from the optical axis, K is the conic coefficient of the surface.

Thanks to the configuration of the lens-surfaced prism and the mirror and the Micromirror Array Lens, the whole lens system can have small thickness (the thickness appears as height in FIG. 6). The compact auto-focus image taking lens system with a Micromirror Array Lens and a lens-surfaced prism of the present invention has many advantages to make thinner and compact auto-focus lens module thanks to the combined properties of the reflective geometry of the Micromirror Array Lens and the lens-surfaced prism. The lens-surfaced prism itself performs its function as a prism and a lens at the same time. The geometry of embodiment 3 has an advantage that the object side and the image side can be assigned in opposite sides dislike the cases of the embodiment 1. This geometry gives highly freedom of application design with layout.

Figure 13:
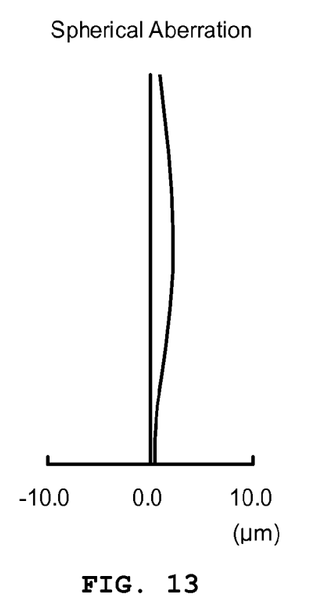
FIG. 13 shows aberration of the compact auto-focus image taking lens system with a Micromirror Array Lens and a lens-surfaced prism of the present invention according to the embodiment 3.

FIG. 13 shows aberration of the compact auto-focus image taking lens system with a Micromirror Array Lens and a lens-surfaced prism of the present invention according to the embodiment 3. Even though the lens system is not rotationally symmetric, the aberration is calculated from the height from the optical axis. The aberration is calculated at the E-line of 546.07 nm. The aberration is shown for an f-number of 2.8187

Figure 14:
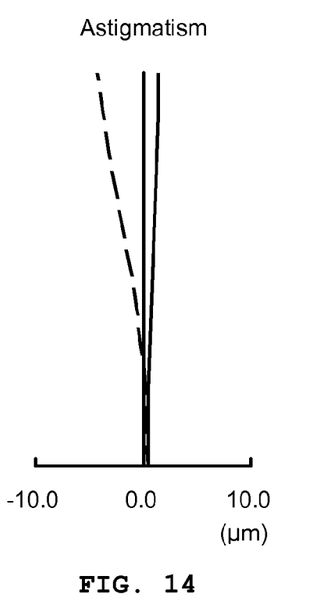
FIG. 14 shows astigmatism of the compact auto-focus image taking lens system with a Micromirror Array Lens and a lens-surfaced prism of the present invention according to the embodiment 3.

FIG. 14 shows astigmatism of the compact auto-focus image taking lens system with a Micromirror Array Lens and a lens-surfaced prism of the present invention according to the embodiment 3. The astigmatism for the compact auto-focus image taking lens system with a lens-surfaced prism of the present invention is shown at the E-line of 546.07 nm for the sagital image surface S (in solid line) and the tangential image surface T (in dashed line).

Figure 15:
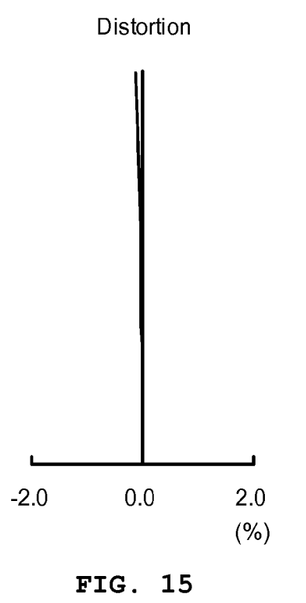
FIG. 15 shows distortion of compact auto-focus image taking lens system with a Micromirror Array Lens and a lens-surfaced prism of the present invention according to the embodiment 3.

FIG. 15 shows distortion of compact image taking lens system with a lens-surfaced prism of the present invention according to the embodiment 3. The distortion for the compact image taking lens system with a lens-surfaced prism of the present invention is shown at the E-line of 546.07 nm. The half-field angle ω for FIG. 14 and FIG. 15 is 23.54°.

Figure 16:
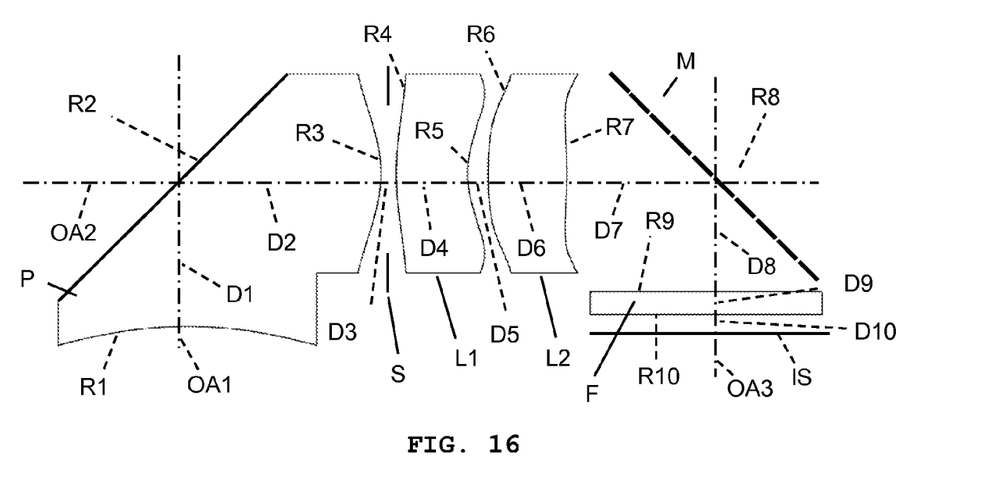
FIG. 16 shows a cross-sectional view of the compact auto-focus image taking lens system with a Micromirror Array Lens and a lens-surfaced prism of the present invention according to the embodiment 4.

FIG. 16 shows a cross-sectional view of the compact auto-focus image taking lens system with a Micromirror Array Lens and a lens-surfaced prism of the present invention according to the embodiment 4. Surfaces of the compact auto-focus image taking lens system are numbered from the object side to the image side. The incident light comes from the object side (left bottom side) and passes through the optical axes OA1, OA2, and OA3 with reflection by the surface R2 and R8 (a Micromirror Array Lens). The light from the object finally makes an image on the image surface IS after passing through the infrared cut-off filter F.

Surfaces R1 and R3 are lens-surfaces of the lens-surfaced prism P. Surface R2 is the reflective surface of the lens-surfaced prism P. The surface R2 makes an internal reflection with change of optical axis from OA1 to OA2. The aperture stop S is located in between the lens-surfaced prism P and the first lens element L1. The first lens element L1 having surfaces R4, R5 has a meniscus shape with a convex on the object side. Focusing by the second lens element L2 having surfaces R6, R7 and the reflection by the surface R8 of the Micromirror Array Lens M makes an image on the image surface IS. Distances D1-D10 represent on-axis surface spacing.

In the embodiment 4, the lens-surfaced prism P has aspheric surfaces R1, R3 on both sides of the lens-surfaced prism P to the object side and the image side. The reflective surface R2 in the lens-surfaced prism P makes an internal reflection from the bottom side of the system along the optical axis OA1, to the right side of the system along the optical axis OA2. Preferably, the surface R2 makes total internal reflection with all fields of the ray through the lens system. Additional reflective coating can be applied to the reflecting surface R2 to enhance the reflection performance. The reflective coating can be made of metal coating or dielectric materials.

In TABLE 4, the surface properties are listed in the order of the surface number from the object side to the image side. Inside the parentheses beside the surface number #, (A) means the aspheric surface profile and (R) means the reflective surface. The surface number # with surface property, the radius of curvature R (in mm) of each surface, on-axis surface spacing D (in mm), as well as the refractive index $N_d$ and the Abbe number $v_d$ are given in TABLE 4. The whole lens system is normalized by the effective focal length of the lens system. Refractive index of the material is measured at the d-line of 587.6 nm and the Abbe number $v_d$ is measured according to the equation (A).

In TABLE 5, the surface coefficients of the aspheric surface are listed. The aspheric surface is described by equation (B). The aspheric coefficients which are not listed in the TABLE 5 are zero. An "E" in the data indicates that the number following the "E" is the exponent to the base 10.

Thanks to the configuration of the lens-surfaced prism and the mirror, the whole lens system can have small thickness (the thickness appears as height in FIG. 16). The compact image taking lens system with a lens-surfaced prism of the present invention has many advantages to make thinner and compact lens module thanks to the combined properties of the reflective geometry of the lens system and the lens-surfaced prism. The lens-surfaced prism itself performs its function as a prism and a lens at the same time.

With the optical power of the lens-surfaced prism, the first lens element, and the second lens element, the optical lens system makes its focus on the image surface. From this base point, the Micromirror Array Lens changes its optical power to perform its auto-focusing property while satisfying the convergence condition and the phase matching condition. When the object distance changes, the Micromirror Array Lens changes it optical power according to the object distance change while maintaining the image distance.

Figure 17:
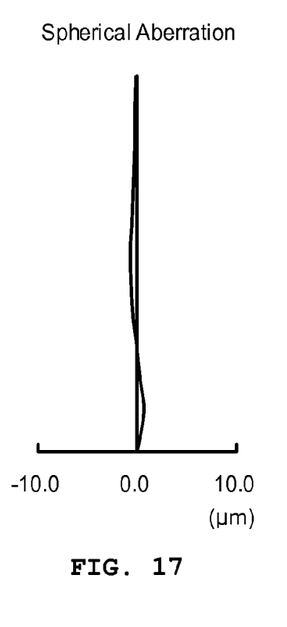
FIG. 17 shows aberration of the compact auto-focus image taking lens system with a Micromirror Array Lens and a lens-surfaced prism of the present invention according to the embodiment 4.

FIG. 17 shows aberration of the compact image taking lens system with a lens-surfaced prism of the present invention according to the embodiment 4. Even though the lens system is not rotationally symmetric, the aberration is calculated from the height from the optical axis. The aberration is calculated at the E-line of 546.07 nm. The aberration is shown for an f-number of 2.7746

Figure 18:
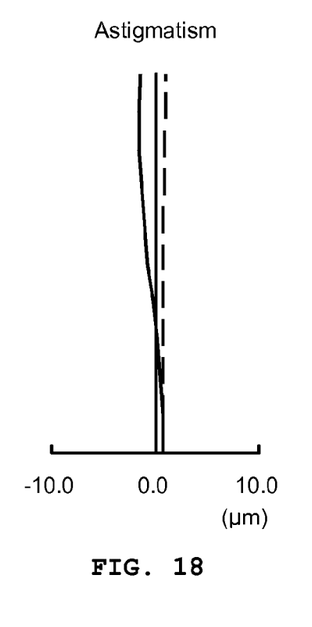
FIG. 18 shows astigmatism of the compact auto-focus image taking lens system with a Micromirror Array Lens and a lens-surfaced prism of the present invention according to the embodiment 4.

FIG. 18 shows astigmatism of the compact image taking lens system with a lens-surfaced prism of the present invention according to the embodiment 4. The astigmatism for the compact image taking lens system with a lens-surfaced prism of the present invention is shown at the E-line of 546.07 nm for the sagital image surface S (in solid line) and the tangential image surface T (in dashed line).

Figure 19:
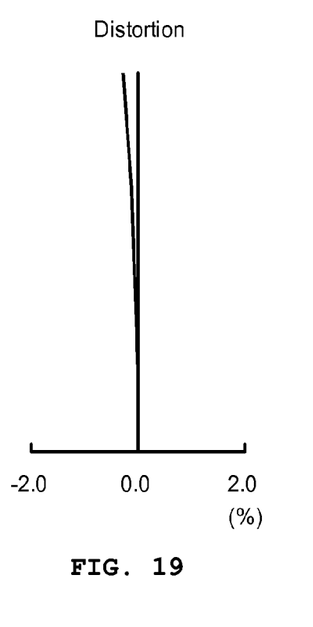
FIG. 19 shows distortion of compact auto-focus image taking lens system with a Micromirror Array Lens and a lens-surfaced prism of the present invention according to the embodiment 4.

FIG. 19 shows distortion of compact image taking lens system with a lens-surfaced prism of the present invention according to the embodiment 4. The distortion for the compact image taking lens system with a lens-surfaced prism of the present invention is shown at the E-line of 546.07 nm. The half-field angle ω for FIG. 18 and FIG. 19 is 26.71°.

The general principle, structure and methods for making the micromirror array devices and Micromirror Array Lens are disclosed in U.S. Pat. No. 7,330,297 issued Feb. 12, 2008 to Noh, U.S. Pat. No. 7,365,899 issued Apr. 29, 2008 to Gim, U.S. Pat. No. 7,382,516 issued Jun. 3, 2008 to Seo, U.S. Pat. No. 7,400,437 issued Jul. 15, 2008 to Cho, U.S. patent application Ser. No. 11/347,590 filed Feb. 4, 2006, U.S. patent application Ser. No. 11/369,797 filed Mar. 6, 2006, U.S. patent application Ser. No. 11/426,565 filed Jun. 26, 2006, U.S. patent application Ser. No. 11/534,613 filed Sep. 22, 2006, U.S. patent application Ser. No. 11/534,620 filed Sep. 22, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007, U.S. patent application Ser. No. 11/742,510 filed Apr. 30, 2007, and U.S. patent application Ser. No. 11/762,683 filed Jun. 13, 2007, all of which are incorporated herein by references.

While the invention has been shown and described with reference to different embodiments thereof, it will be appreciated by those skills in the art that variations in form, detail, compositions and operation may be made without departing from the spirit and scope of the present invention as defined by the accompanying claims.

TABLE 1

| surface # | R | D | $N_d$ | $v_d$ |
|---|---|---|---|---|
| R1 (A) | −0.92820 | 0.44446 | 1.52713 | 55.74 |
| R2 (R) | ∞ | −0.55558 | 1.52713 | 55.74 |
| R3 (A) | 0.39091 | −0.05559 | | |
| R4 (A) | −0.64784 | −0.16223 | 1.63200 | 23.41 |
| R5 (A) | −0.27917 | −0.06309 | | |
| R6 (A) | −0.66642 | −0.30001 | 1.52713 | 55.74 |
| R7 (A) | −33.98913 | −0.42224 | | |
| R8 | ∞ | 0.42541 | | |

TABLE 2

| surface # | R | K | $A_4$ | $A_6$ | $A_8$ | $A_{10}$ |
|---|---|---|---|---|---|---|
| R1 | −0.92820 | −0.20636 | 0.16956 | 1.363E+00 | −3.340E+00 | 4.976E+00 |
| R3 | 0.39091 | −0.30058 | −8.63977 | 5.426E+01 | −3.693E+02 | 9.995E+02 |
| R4 | −0.64784 | 0.81654 | 3.20934 | −7.775E+01 | 1.293E+03 | −7.593E+03 |
| R5 | −0.27917 | −0.49488 | 17.56064 | −5.078E+02 | 9.303E+03 | −5.967E+04 |
| R6 | −0.27917 | −0.49488 | 17.56064 | −5.078E+02 | 9.303E+03 | −5.967E+04 |
| R7 | −33.98913 | 0.00000 | −6.06996 | −4.485E+01 | 1.545E+02 | −5.544E+03 |

TABLE 3

| surface # | R | K | D | $N_d$ | $v_d$ |
|---|---|---|---|---|---|
| R1 (C) | −1.93102 | 2.31123 | 0.39020 | 1.53199 | 66.09 |
| R2 (R) | ∞ | | 0.48775 | 1.53199 | 66.09 |
| R3 (C) | 0.42744 | −4.53878 | 0.04762 | | |
| R4 (C) | −0.49031 | −4.21298 | 0.18171 | 1.73534 | 28.43 |
| R5 (C) | −0.21264 | −2.48441 | 0.08061 | | |
| R6 (C) | −1.14783 | −1.19719 | 0.29265 | 1.52580 | 66.62 |
| R7 (C) | 0.63617 | −2.10327 | 0.35118 | | |
| R8 | ∞ | | 0.39020 | | |

TABLE 4

| surface # | R | D | $N_d$ | $v_d$ |
|---|---|---|---|---|
| R1 (A) | −0.27443 | 0.22987 | 1.52996 | 55.84 |
| R2 (R) | ∞ | 0.48775 | 1.53199 | 66.09 |
| R3 (A) | −0.08701 | 0.01022 | | |
| R4 (A) | 0.19895 | 0.04700 | 1.61420 | 25.59 |
| R5 (A) | 0.06440 | 0.01357 | | |
| R6 (A) | 0.23797 | 0.05211 | 1.52996 | 55.84 |
| R7 (A) | −0.27250 | 0.09195 | | |
| R8 (R) | ∞ | 0.07885 | | |
| R9 (F) | ∞ | 0.01532 | 1.51680 | 64.17 |
| R10 | ∞ | 0.01277 | | |

TABLE 5

| surface # | R | K | $A_4$ | $A_6$ | $A_8$ | $A_{10}$ |
|---|---|---|---|---|---|---|
| R1 | −0.27443 | 2.19553 | 1.896E+01 | 7.697E+02 | 2.378E+03 | 4.113E+05 |
| R3 | −0.08701 | −0.39939 | 6.640E+02 | −8.562E+04 | 1.127E+07 | −6.357E+08 |
| R4 | 0.19895 | 0.10050 | −2.898E+02 | 6.348E+04 | −2.709E+07 | 3.426E+09 |
| R5 | 0.06440 | −0.80312 | −1.686E+03 | 6.808E+05 | −2.394E+08 | 3.082E+10 |
| R6 | 0.23797 | 8.82393 | 3.041E+02 | 2.941E+05 | −1.119E+08 | 8.679E+09 |
| R7 | −0.27250 | −0.87898 | 5.447E+02 | 1.124E+04 | 4.567E+07 | −8.189E+09 |

The invention claimed is:

1. A compact auto-focus image taking lens system with a Micromirror Array Lens and a lens-surfaced prism comprising from an object side to an image side:
    a) a prism having a concave surface on the object side, an internal reflective surface, and a surface on the image side;
    b) an aperture stop;
    c) a first lens element having a negative optical refractive power;
    d) a second lens element having a positive optical refractive power; and
    e) a Micromirror Array Lens comprising a plurality of micromirrors having reflective surfaces; and
    f) an image sensor having an image surface;
wherein the Micromirror Array Lens is configured to change focus of the image by controlling the motions of the micromirrors.

2. The compact auto-focus image taking lens system of claim 1, wherein the Micromirror Array Lens changes optical power to change focus of the image.

3. The compact auto-focus image taking lens system of claim 2, wherein the Micromirror Array Lens has zero optical power when an object lies at reference object distance of the lens system.

4. The compact auto-focus image taking lens system of claim 2, wherein the Micromirror Array Lens has negative optical power when an object lies at a distance farther than reference object distance of the lens system.

5. The compact auto-focus image taking lens system of claim 2, wherein the Micromirror Array Lens has positive optical power when an object lies at a distance nearer than reference object distance of the lens system.

6. The compact auto-focus image taking lens system of claim 1, wherein the internal reflective surface of the prism makes total internal reflection, wherein the optical index of the prism is larger than 1.5.

7. The compact auto-focus image taking lens system of claim 1, wherein the internal reflective surface of the prism is a reflective surface made of internal reflective coating.

8. The compact auto-focus image taking lens system of claim 1, wherein the first lens element has at least one aspheric surface on the object side and on the image side.

9. The compact auto-focus image taking lens system of claim 1, wherein the first lens element has a meniscus shape with a convex surface on the object side.

10. The compact auto-focus image taking lens system of claim 1, wherein the first lens element has both side aspheric surfaces on the object side and on the image side.

11. The compact auto-focus image taking lens system of claim 1, wherein the second lens element has at least one aspheric surface on the object side and on the image side.

12. The compact auto-focus image taking lens system of claim 1, wherein the second lens element has a meniscus shape with a convex surface on the object side.

13. The compact auto-focus image taking lens system of claim 1, wherein the second lens element has both side aspheric surfaces on the object side and on the image side.

14. The compact auto-focus image taking lens system of claim 1, wherein the second lens element is made of plastic.

15. The compact auto-focus image taking lens system of claim 1, further comprising an infrared cut-off filter between the second lens element and the image surface.

16. A compact auto-focus image taking lens system with a Micromirror Array Lens and a lens-surfaced prism comprising from an object side to an image side:
    a) a prism having a concave surface on the object side, an internal reflective surface, and a surface on the image side, wherein both sides of the object side and the image sides are aspheric;
    b) an aperture stop;
    c) a first lens element, wherein the first lens element is a negative optical refractive power meniscus shape lens with a convex on the object side, wherein the first lens element is made of plastic with at least one aspheric surface on the object side surface and the image side surface;
    d) a second lens element having a positive optical refractive power;
    e) a Micromirror Array Lens comprising a plurality of micromirrors having reflective surfaces; and
    f) an image surface, wherein the image taking lens system makes image on the image surface;
wherein the Micromirror Array Lens is configured to change focus of the image by controlling the motions of the micromirrors.

17. The compact auto-focus image taking lens system of claim 16, wherein the Micromirror Array Lens changes optical power to change focus of the image.

18. The compact auto-focus image taking lens system of claim 16, wherein the first lens element has both side aspheric surfaces on the object side surface and on the image side surface.

19. The compact auto-focus image taking lens system of claim 16, wherein the second lens element has at least one aspheric surface on the object side and on the image side surface with a convex on the object side surface.

20. The compact auto-focus image taking lens system of claim 16, wherein the second lens element has a meniscus shape with a convex on the object side.

21. The compact auto-focus image taking lens system of claim 16, further comprising an infrared cut-off filter between the second lens element and the image surface.

22. A compact auto-focus image taking lens system with a Micromirror Array Lens and a lens-surfaced prism comprising from an object side to an image side:
    a) a prism having a concave surface on the object side, an internal reflective surface, and a concave surface on the image side;
    b) an aperture stop;

c) a first lens element, wherein the first lens element is a negative optical refractive power meniscus shape lens with a convex on the object side, wherein the first lens element is made of plastic with at least one aspheric surface on the object side surface and the image side surface;

d) a second lens element having a positive optical refractive power with a convex on the object side, wherein the second lens element is made of plastic;

e) a Micromirror Array Lens comprising a plurality of micromirrors having reflective surfaces; and f) an image surface wherein the image taking lens system makes image on the image surface;

wherein the Micromirror Array Lens is configured to change focus of the image by controlling the motions of the micromirrors.

23. The compact auto-focus image taking lens system of claim 22, wherein the Micromirror Array Lens changes optical power to change focus of the image.

24. The compact auto-focus image taking lens system of claim 22, wherein the second lens element has at least one aspheric surface on the object side and on the image side surface with a convex on the object side surface.

25. The compact auto-focus image taking lens system of claim 22, wherein the second lens element has a meniscus shape with a convex on the object side.

* * * * *